Dec. 20, 1960 B. D. LOUGHLIN 2,965,703
COLORIMETRIC COMPUTER
Filed Nov. 19, 1958 3 Sheets-Sheet 3

United States Patent Office 2,965,703

Patented Dec. 20, 1960

2,965,703

COLORIMETRIC COMPUTER

Bernard D. Loughlin, Huntington, N.Y., assignor to Hazeltine Research, Inc., Chicago, Ill., a corporation of Illinois Filed Nov. 19, 1958, Ser. No. 774,989

26 Claims. (Cl. 178—5.2)

This invention pertains to correlation of colorimetric data, and particularly to means for computing from specified colorimetric data applicable to one illuminating condition required colorimetric data applicable to another illuminating condition.

The copending joint application of applicant, W. F. Bailey, and C. E. Page for "Electronic Previewer for Negative Color Film," Serial No. 662,199, filed May 28, 1957, and assigned to applicant's assignee, describes equipment for electronically simulating the various steps in photochemical processes by which derived color pictures are prepared from original color pictures, and for providing a previewed display of how such derived pictures will appear. As described in more detail therein, the previewing equipment includes control knobs which may be adjusted to simulate changes in the intensity and color balance of the printing light which is used in the photochemical process for illuminating the original color picture. The resultant light from the original picture then establishes the exposure of the color-sensitive materials which are used for producing the derived picture. Consequently, by adjusting the control knobs until the electronic image produced by the previewer has a desired appearance, a derived picture having the same appearance may be prepared by adjusting the printing light in conformance with the calibrated knob settings. Each knob may correspond to a particular primary color component of the printing light, and may be numerically calibrated in terms of the required relative attentuations of such color components. In particular, where the photochemical process employs color-sensitive materials having substantially separate responses to each of three primary color components of white light, each control knob may be calibrated in terms of the optical densities of respective sets of filters for controlling the intensity of the corresponding color components of white light incident on the materials. Such an arrangement is ideally suited to use with additive type printing light sources, wherein three separate beams of the three primary color light components are combined to produce the resultant printing light. In that case an optical filter placed in the path of any beam will attentuate only one color component of the printing light, so that the setting of the previewer control knob for that color component will directly give the density which the filter should have in order to obtain the desired color balance in the reproduced picture.

However, many photochemical color picture-reproduction processes employ subtractive type printing light sources. In such printers a beam of substantially white light is passed through a stack of color-compensating optical filters having colors complementary to those of the primary color components of the printing light. Ideally, each such filter will attentuate only its complementary color light component. If that were actually so, color-compensating filters having densities the same as the densities of the filters used in additive printers would yield the same resultant printing light. In fact, however, the actual filters used in subtractive printers attenuate all color components of the light incident thereon in different degrees. That is, a cyan filter for attenuating the red primary component of the printing light will also attentuate the green and blue components; a magenta filter for attentuating the green printing light component will also attenuate the red and blue components; and a yellow filter for attenuating the blue component will also attenuate green and red light. Where colorimetric data is provided in terms of the required attenuations of the respective primary color components of the printing light, as in the case of the electronic previewer referred to above, the task of finding a combination of color-compensating filters which acting together will produce the required primary color attenuations becomes difficult and time-consuming. Heretofore, this has necessitated trial-and-error procedures.

Accordingly, an object of the invention is to provide computing means for converting data applicable to a specified colorimetric condition to data applicable to a required colorimetric condition.

A further object is to provide electronic computing means for correlating colorimetric data applicable to additive color printers with colorimetric data applicable to subtractive color printers.

A still further object is to provide economical computing equipment adapted to being controlled in accordance with specified relative values of a set of primary color components of light to directly indicate the nominal color attenuative values of each of a plurality of sets of color-compensating filters which may be employed to establish such color components.

A computer constructed in accordance with the invention determines the value of each of a plurality of required colorimetric quantities which are respectively proportional to the sum of the products of the value of each of a plurality of specified colorimetric quantities multiplied by respective constant coefficients for each combination of specified and required quantities. It may comprise a plurality of elementary computing units respectively corresponding to the plurality of required quantities, each of the computing units being respectively proportioned in fixed degree in accordance with the respective constant coefficients applicable to the respective specified quantities and the required quantity corresponding to that computing unit. Each computing unit is also adapted to be further variably proportioned. A plurality of control means respectively variable in correspondence with the values of the specified quantities are respectively coupled to the computing units, each control means being adapted to control the variable proportioning of the computing unit coupled thereto in predetermined relation to its own variation. Means respectively connected to each of the computing units and responsive to the respective total proportionings thereof are provided for respectively indicating the values of the required quantities.

A computer in accordance with the invention may additionally comprise auxiliary variable control means coupled to each of the computing units to effect additional control of the variable proportioning thereof in accordance with the values of respective arbitrary quantities which additively combine with the respective product summations to determine the values of the required colorimetric quantities. Such a computer may also include means coupled to the auxiliary variable control means and responsive to the proportioning effected thereby to indicate the value of a common neutral attenuative component supplementary to the arbitrarily selected number of filters in all of said filter sets.

The invention is described in more detail in the following specification and accompanying drawings, in which:

Figs. 1–3, inclusive, are curves showing the effect of different color-compensating filters on the spectral responses of a typical positive color film;

Figure 1:
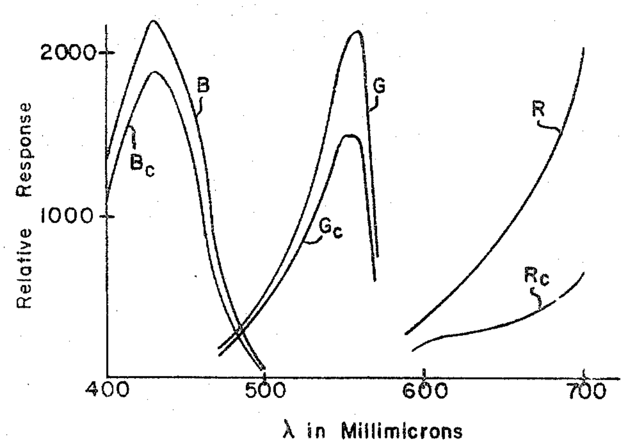

Referring to the curves of Fig. 1, these show the effect of a cyan or C color-compensating filter, which is red subtractive, on the spectral response of a typical positive color film such as Eastman Type 5382. The curves denoted B, G, and R are the relative spectral responses of the respective blue, green and red-sensitive emulsions of the film to white light. The curve $R_c$ shows the resultant response of the red-sensitive emulsion when the light incident thereon has been passed through a C filter of nominal density 0.5, such as Kodak Type 50C. The nominal density value is simply an approximate average density within the spectral region of the color the filter principally attenuates, or red in this case. The curves $B_c$ and $G_c$, similarly show the resultant responses of the blue and green sensitive film to white light which has been passed through the same filter. Since curves $B_c$ and $G_c$ fall below curves B and G, it is apparent that a cyan or C filter possesses appreciable density in the green and blue spectral regions as well as in the red spectral region.

Figure 2:
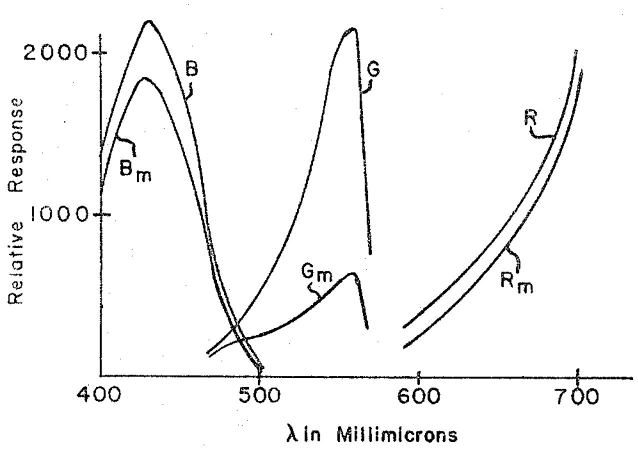
Figure 3:
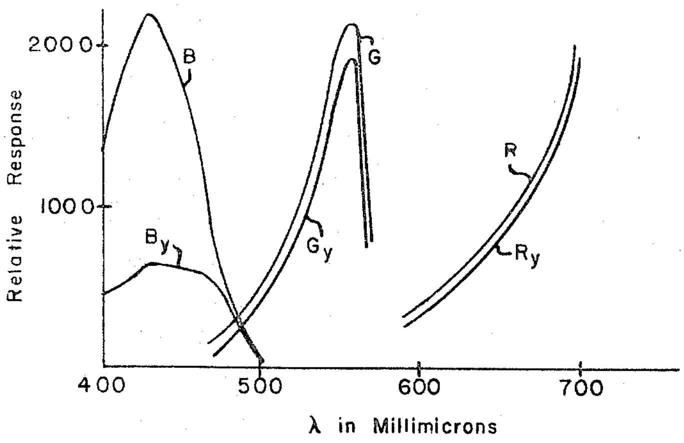

The curves of Figs. 2 and 3 respectively show the corresponding effects of magenta (M) and yellow (Y) color-compensating filters of nominal density 0.5 on the same film spectral response. Although an M filter has a major effect in the green spectral region, as shown by the large drop from curve G to curve $G_m$, in Fig. 2, the drop from curve B to curve $B_m$ and from curve R to curve $R_m$ shows that it also possesses density to blue and red light. Correspondingly, the large drop from curve B to curve $B_y$ in Fig. 3, indicates that a Y filter has maximum density to blue light, and the difference between curves G and $G_y$ and curves R and $R_y$ shows that it also possesses density to green and red light.

Considering the curves of Figs. 1, 2, and 3 together, it is significant to note that the spectral response in each of the red, green, and blue regions reaches a maximum at substantially the same wave length regardless of the filter under which the film is exposed. That is, the peak response wave lengths for the blue, green, and red regions respectively remain at about 430, 550 and 690 millimicrons. In addition, the general shapes of the response curves for a given region remain closely similar, differing mainly in amplitude alone. Accordingly, it may be concluded that the taking response of a positive film subjected to light passed through a stack of color-compensation filters will be substantially the same as when subjected to light derived by combining individual red, blue, and green color component beams which have been respectively attenuated to a degree proportional to the sum of the individual attenuations of each filter in the stack to each of those color components. In other words, the density to any particular primary color component of a given combination of cyan, magenta, and yellow color-compensating filters is simply the arithmetic sum of the individual densities of each of the filters to that color component.

The electronic previewer described in the copending application identified above is adapted to provide the attenuation values or densities which individual filters for individual red, green, and blue primary color beams should have so that the printing light derived by combining the filtered beams will properly expose the color-sensitive material employed in a photochemical color picture reproduction process. Such material may be a picture color film having three emulsions substantially individually sensitive to light in the red, green, and blue spectral regions. For the purpose of this application, the construction of the previewer may be adequately comprehended by reference to Fig. 4. As shown therein, a scanner 13 scans an original color picture such as the image on a negative color film 11. Scanner 13 is adapted to produce individual electrical voltages respectively proportional to the exposures to which the positive film emulsions will respectively be subjected when the positive film is exposed to printing light which has been passed through the negative film. This correspondence is on a time-sequential point-by-point basis for all points in the negative image. A specific embodiment of scanner 13 could comprise a cathode-ray tube which produces a point of light successively incident on all points of negative film 11; a dichroic mirror for separating the beam of light emergent from film 11 into the red, green, and blue primary color components; and a set of photocells respectively responsive to those light components to produce the exposure-representative voltages. All this equipment is adjusted so that the transfer relationship between voltages output from each channel and light input thereto from the corresponding component color of the negative film is substantially linearly proportional to the relation between the exposure to which printing light passed through the same component color of the negative film subjects the positive film emulsion responsive to that color in the actual printing process.

The exposure-representative voltages are then applied to respective linear amplifiers 15, 17, and 19 which serve to modify them by respective constant factors such that the amplified voltages are in the same relative proportions as the exposures of the corresponding positive film emulsions. The resultant voltages appear across potentiometers 21, 23, and 25, the tap settings of which are individually adjustable by control knobs **21*a*, 23*a*, and 25*a*. Since the voltage across potentiometer 23, for example, is linearly proportional to the exposure of the red-sensitive positive film emulsion, and since the exposure of that emulsion is linearly proportional to the intensity of the red component of the printing light, a variation in the tap setting of the potentiometer arm will correspond to a proportional variation in that intensity. A variation of the settings of potentiometers 23 and 25 will similarly be proportional to a corresponding variation of the intensities of the green and blue components of the printing light. Accordingly, knobs 21*a*, 23*a*, and 25*a* constitute a set of control knobs of the kind to which reference was previously made. The reduced exposure-representative voltages at the taps of potentiometers 21, 23, and 25 are respectively applied to equipment designated in blocks 27, 29, and 31 which respectively simulate the dye-density transfer characteristics of the red, green, and blue-sensitive positive film emulsions to derive voltages proportional to the densities of the color dyes produced by the exposed emulsions as a result of further photochemical processing operations. These density-representative voltages are then cross-coupled in a network 33 which simulates the density contribution of each dye to the total density of the resultant positive color picture to each of the red, green, and blue color components of white light incident thereon when the picture is viewed. The cross-coupled density-representative voltages are finally applied to image-reproducing equipment 35 having a display screen 37** on which an image of the reproduced positive picture is formed. This equipment may comprise a nonlinear exponential amplifier, for converting the density-representative voltages into voltages representative of the corresponding component color light intensities, and a tricolor cathode-ray tube responsive to the intensity-representative voltages to actually produce the electronic color image on its screen.

Figure 4:
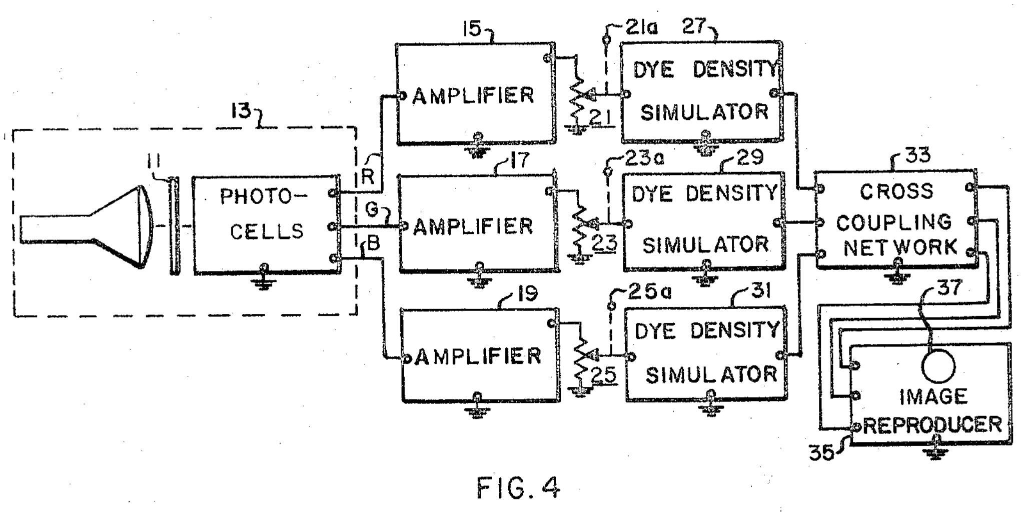
Fig. 4 is a functional drawing of color picture previewing equipment of the type described in copending application Serial No. 662,199.
Figure 5:
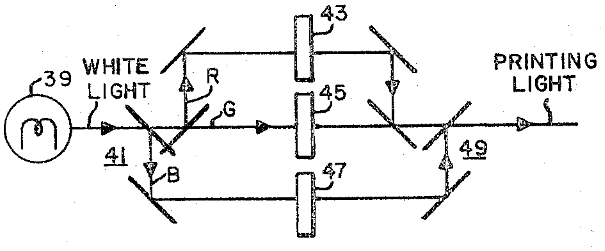
Fig. 5 is a schematic drawing of an additive printing light source.

In order to use the previewer equipment of Fig. 4 for determining the proper adjustment of the printing light in a photochemical process for deriving a color picture reproduction from the original picture, control knobs 21a, 23a, and 25a are adjusted to attenuate the red, green, and blue exposure-representative voltages at the terminals of potentiometers 21, 23, and 25 in different degrees until the electronic color image on screen 37 has a desired intensity and color balance. If the photochemical process employs an additive printing light source, the operator then adjusts the relative attenuations of the red, green, and blue components of the printing light in the proportions indicated by the settings of the previewer control knobs. For example, suppose that the additive printer is essentially as shown in Fig. 5, wherein substantially white light from a lamp 39 is split by a set of dichroic mirrors 41 into red, green, and blue primary color components. The beams of component colors respectively pass through filters 43, 45, and 47 of individually adjustable densities and are then recombined by another set of dichroic mirrors 49 to produce the resultant printing light. The use of this equipment in conjunction with the previewer of Fig. 4 would then simply involve adjusting filters 43, 45, and 47 to produce optical attenuations proportional to the electrical attenuations indicated by the previewer control knobs. To simplify this relationship between previewer and printer even further, each of the previewer potentiometers may be constructed to provide equal increments in logarithmic attenuation between successive settings thereof. The corresponding control knobs may then be respectively variable in equal logarithmic increments corresponding to the uniform logarithmic density increments by which photographic filters are usually identified. This may be done because optical density is linearly proportional to the logarithm of light attenuation.

Figure 6:
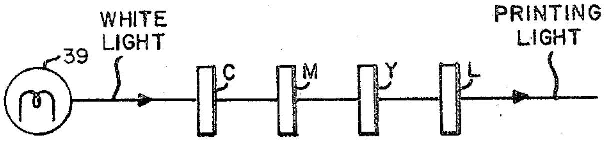
Fig. 6 is a schematic drawing of a subtractive printing light source.

However, suppose that the actual photochemical processing equipment utilizes a subtractive type printer as shown in Fig. 6. There, a beam of white light from lamp 39 is serially passed through a stack of color-compensating filters C, M, and Y which respectively principally attenuate the red, green, and blue primary color components of that light to produce a resultant printing light. More than one filter of a particular color may be included to achieve additional density to that color. In addition, a neutral filter L is usually included to provide an adjustable density for all color components. As explained above, each of the C, M, and Y filters in fact attenuates all primary color components of the incident light in varying degrees, the total density of the stack to a given color component being the sum of the individual densities of all filters thereto. As a result, a simple selection of filters having the nominal density values indicated by the previewer control knobs would give highly erroneous results.

The invention provides means for easily interpreting or utilizing the control knob settings to determine the correct density values of filters C, M, Y, and L. To accomplish this, the effective density of each of a complete set of standard color-compensating filters of different nominal densities for a particular one of the primary color components to which the positive film is sensitive is determined. This may be done by dividing the area under the curve of spectral response of each of the positive film emulsions to white light by the area under each of the curves of spectral response of the same emulsion to white light passed through each filter. The logarithms of the resultant quotients are then the required effective density values. For example, the areas under curves B, G, and R of Fig. 1 respectively represent the spectral responses of the blue, green, and red-sensitive film emulsions to white light. The areas under curves $B_c$, $G_c$, and $R_c$ respectively represent the corresponding responses when the incident light has been passed through standard color-compensating filter 50C. The latter curves may be derived by multiplying the ordinates of the spectral response curve for each of the emulsions by the ordinates of the spectral fractional attenuation of the filter. Fractional attenuation data is readily available in many photographic publications. For instance, the Eastman Kodak Company booklet entitled "Kodak Wratten Filters," 19th edition, published in 1957, gives spectral density curves for Y, M, and C filters on pages 71–75, inclusive. Since density is the logarithm of fractional attenuation, the required data for constructing curves $B_c$, $G_c$, and $R_c$ is readily determined. The logarithms of the quotients obtained by dividing the B, G, and R curve areas in Fig. 1 by the $B_c$, $G_c$, and $R_c$ areas, respectively, will be the effective densities $D_{cb}$, $D_{cg}$, and $D_{cr}$ of the 50C filter to light over the blue, green, and red spectral regions of positive film responses. The same procedure may be repeated for the entire set of C filters having nominal densities 0.4, 0.3, 0.2, 0.1 and 0.05, and again for the respective sets of M and Y filters over the same ranges of nominal densities.

Data obtained as described in the foregoing paragraph shows that the densities of the filters in any set to any one of the primary color components are very closely linearly proportioned to the nominal filter density value. Thus, the density of any of the set of M filters to red light is given by $$D_{mr}=0.03M+0.04 \quad (1)$$

where M is the nominal filter density of 0.5, 0.4, etc. Similarly, the densities of the C and Y filters to red light are, respectively $$D_{cr}=0.89C+0.04 \quad (2)$$
$$D_{yr}=0.00Y+0.04 \quad (3)$$

The total density of red light of any combination of filters is, in accordance with the spectral analysis of filter effect given above, simply the arithmetic sum of the densities of each filter to such light. Consequently, the total density D of any combination of color-compensating filters to red light is given by $$D'_r=0.00Y+0.03M+0.89C+0.04N \quad (4)$$

where N is the number of filters employed.

Actual subtractive printers include a neutral filter of variable density $D_l$. Consequently, the actual total density to the component of the light from lamp 39 in the subtractive printer of Fig. 6 to which the red-sensitive positive film emulsion responds is $$D_r=0.00Y+0.03M+0.89C+0.04N+1.00D_l \quad (5)$$

The last two terms do not affect the color of this printing light component. Since they will be found to occur equally in $D_r$, $D_g$, and $D_b$, they may be conveniently grouped together as a total neutral density $D_n$ defined as $$D_n=0.04N+1.00D_l \quad (6)$$

By making this substitution in Equation 5, and by similarly deriving equations for total density to green and blue in terms of nominal filter densities, the following set of total density equations is obtained:

$$D_r=0.00Y+0.03M+0.89C+D_n \quad (7)$$
$$D_g=0.05Y+0.85M+0.18C+D_n \quad (8)$$
$$D_b=0.92Y+0.13M+0.08C+D_n \quad (9)$$

Equations 7, 8, and 9 may be solved for the nominal density values C, M, and Y in terms of specified total densities of each color component. Also, Equation 6 may be solved for $D_l$. The resultant equations are:

$$C=1.13D_r-0.04D_g-1.09D_n \quad (10)$$
$$M=1.19D_g-0.24D_r-0.06D_b-0.89D_n \quad (11)$$
$$Y=1.10D_b-0.17D_g-0.07D_r-0.86D_n \quad (12)$$
$$D_l=D_n-0.04N \quad (13)$$

The significance of Equations 10–13 is that if the densities represented by the settings of the control knobs 21a, 23a, and 25a of the electronic previewer in Fig. 4 are substituted therein for $D_r$, $D_g$, and $D_b$, respectively, the resultant combination of values of C, M, Y, and $D_n$ may be used in a subtractive printer to obtain the same positive film exposures as would be produced by an additive printer employing filters of densities as indicated by the control knob settings. The value of $D_n$ may be chosen to render the value of one of C, M, or Y zero, thus permitting use of only two sets of color-compensation filters. Once those sets are selected, the total number of filters employed will be the value of N in Equation 13. Substituting that value therein, together with the chosen value of $D_n$, that equation then gives the proper density value $D_l$ of the neutral filter which should be employed in the printer.

Of course, the specific constant color attenuation coefficients appearing in Equations 10, 11, and 12 were derived, as stated, for Eastman positive film Type 5382 and the C, M and Y sets of standard Kodak color-compensating filters. When other types of filters and/or color-sensitive material having different spectral characteristics are employed, the coefficients in these equations may then also be different and should be re-derived for the materials employed. In practice, however, most types of positive color film now in use have very similar spectral characteristics. Therefore, when the designated filters are employed, the coefficients shown in the equations will remain sufficiently accurate for most film types. The invention embraces computing arrangements for performing the arithmetic operations required by Equations 10–13, either electrically or mechanically, using the specified color attenuative values of $D_g$, $D_r$, and $D_b$. Since equations of this form are encountered in virtually all types of colorimetric matching problems, computers so constructed will have broad application.

Figure 7:
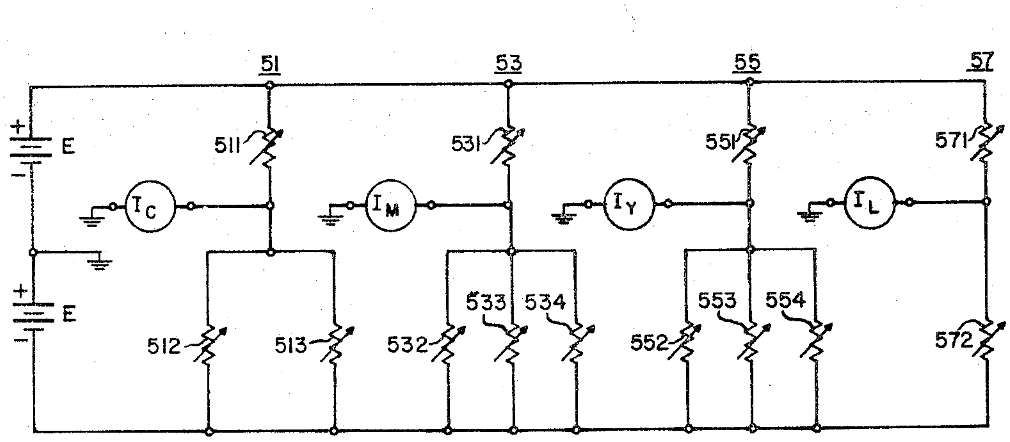
Fig. 7 is a circuit diagram of an electrical computer controlled in accordance with the invention.

The general arrangement of an electrical embodiment of a computer in accordance with the invention is shown in Fig. 7. A pair of sources of equal and opposite direct voltage E relative to ground are applied in series across each of four elementary computing units 51, 53, 55, and 57 which respectively correspond to or simulate Equations 10 to 13. For that purpose, each computing unit is proportioned in accordance with the terms of the equation to which it corresponds. Such proportioning for each computing unit may be effected by a plurality of elements or branches respectively corresponding to those terms. For example, unit 51 for determining the value C as given by Equation 10 may be a network comprising an element or branch 511 having a resistance of $$\frac{1}{1.13D_r}$$

ohms connected to +E and to a common node with two other branches 512 and 513 respectively having resistances of $$\frac{1}{0.04D_g}$$

ohms and $$\frac{1}{0.09D_n}$$

ohms connected to −E. The common node of all three branches is connected to indicating means such as an ammeter $I_C$, the reading of which in amperes will therefore be $$I_c=(1.13D_r)E-(0.04D_r+1.09D_n)E$$

or $$I_c=(1.13D_r-0.04D_g-1.09D_n)E$$

or $$\frac{I_c}{E}=1.13D_r-0.04D_g-1.09D_n \qquad (14)$$

Since the right-hand side of Equation 14 is identical with that side of Equation 10, the value $$\frac{I_c}{E}$$

will be the density of the C or cyan filter. As E is constant, the scale of ammeter $I_C$ may therefore be linearly calibrated in terms of the density values of the C filters.

Computing unit 53 in Fig. 7 may similarly be a network comprising a resistive branch 531 having a resistance of $$\frac{1}{1.19D_g}$$

ohms connected to a common node with three other branches 532, 533, and 534 the resistances of which are respectively $$\frac{1}{0.24D_r}\text{ ohms, }\frac{1}{0.06D_b}\text{ ohms, and }\frac{1}{0.89D_n}\text{ ohms}$$

The common node of all four branches is connected to indicating means such as an ammeter $I_M$. Accordingly, the foregoing description of computing unit 51 also applies to computing unit 53, and so the ratio of the current through ammeter $I_M$ divided by E will be the density value M in Equation 11. This ammeter may be therefore directly calibrated in terms of M or magenta filter density values.

Computing unit 55 in Fig. 7 is a network comprising a branch 551 having a resistance of $$\frac{1}{1.10D_b}$$

ohms connected to a common node with three branches 552, 553, and 554 respectively having resistances $$\frac{1}{0.17D_g}\text{ ohms, }\frac{1}{0.07D_r}\text{ ohms, and }\frac{1}{0.86D_n}\text{ ohms}$$

The common node is connected to ammeter $I_Y$. Computing unit 55 is thus proportioned in accordance with the terms of Equation 12 in the same way as computing units 51 and 53 are respectively proportioned in accordance with the terms of Equations 10 and 11, so that ammeter $I_Y$ may be calibrated in terms of Y or yellow filter density values.

Note that each computing unit in Fig. 7, as described, has been proportioned in fixed degree in accordance with the respective color attenuative constant coefficients applicable to $D_r$, $D_g$, and $D_b$, respectively, for the filter set corresponding to that unit, and is capable of controlled variable proportioning in accordance with the specified values of $D_r$, $D_g$, and $D_b$. Such control, of course, will affect only the corresponding branches of each computing unit, the proportioning of a remaining or auxiliary branch thereof being governed by the value of the neutral attenuative component of the indicated color attenuative values, as described above. In general, each computing unit has three principal branches proportioned in correspondence with the values of $D_r$, $D_g$ and $D_b$, and a fourth branch proportioned in correspondence with the arbitrarily selected value of $D_n$. It happens that the coefficient of the term $D_b$ in Equation 9 is zero, so that only three branches suffice for computing unit 51. However, it may be accurately regarded as having four branches of which the attenuative coefficient of the branch corresponding to the value of $D_b$ is zero.

The computer of Fig. 7 may be completed by an additional computing unit 57 comprising a branch 571 having a resistance of $$\frac{1}{D_n}$$

ohms connected to a branch 572 having a resistance of $$\frac{1}{0.04N}$$

ohms, the common node of these two resistors being connected to an ammeter $I_L$. The reading of this ammeter may be expressed as $$\frac{I_l}{E}=D_n-0.04N \qquad (15)$$

so that by comparison with Equation 13 it is evident that ammeter $I_L$ may be directly calibrated to read neutral filter density values $D_l$.

Each of the resistive branches or elements in the computer of Equation 7 is variable, and must be adjusted in accordance with the specified color attenuative values $D_r$, $D_g$, and $D_b$. After accomplishing this, each of the branches dependent on neutral density, or branches 513, 534, 554, and 571, are varied together until the reading of one of ammeters, $I_C$, $I_M$, or $I_Y$ is reduced to zero, the other two readings still being positive. Assume that this occurs for ammeter $I_C$. The readings of the remaining two ammeters, $I_M$ and $I_Y$, then respectively give the required total nominal color attenuative values or densities of the correct combination of standard M and Y filters. That is, if the reading of the $I_M$ ammeter calls for a density of 0.65, a satisfactory combination of M color-compensating filters will be those having respective nominal densities 0.5, 0.1, and 0.05. A choice of standard Y filters is similarly made to establish the nominal density required by the reading of the $I_Y$ ammeter. Assume that only two Y filters are necessary for that purpose. The total number of color-compensating filters employed will therefore be five. This value of "N" is then used to adjust branch 572 in computing unit 57 to a resistance of $$\frac{1}{0.04\times 5}$$

or 5 ohms. The reading then given by ammeter $I_L$ will be the density of the neutral filter to be employed. The complete set of M, Y, and neutral filters so selected may then be used in a subtractive printer of the type shown in Fig. 6 to provide a printing light which will expose the positive film to the same degree as would be produced by the additive printer of Fig. 5 with red, green, and blue filter densities $D_r$, $D_g$, and $D_b$ respectively.

Figure 8:
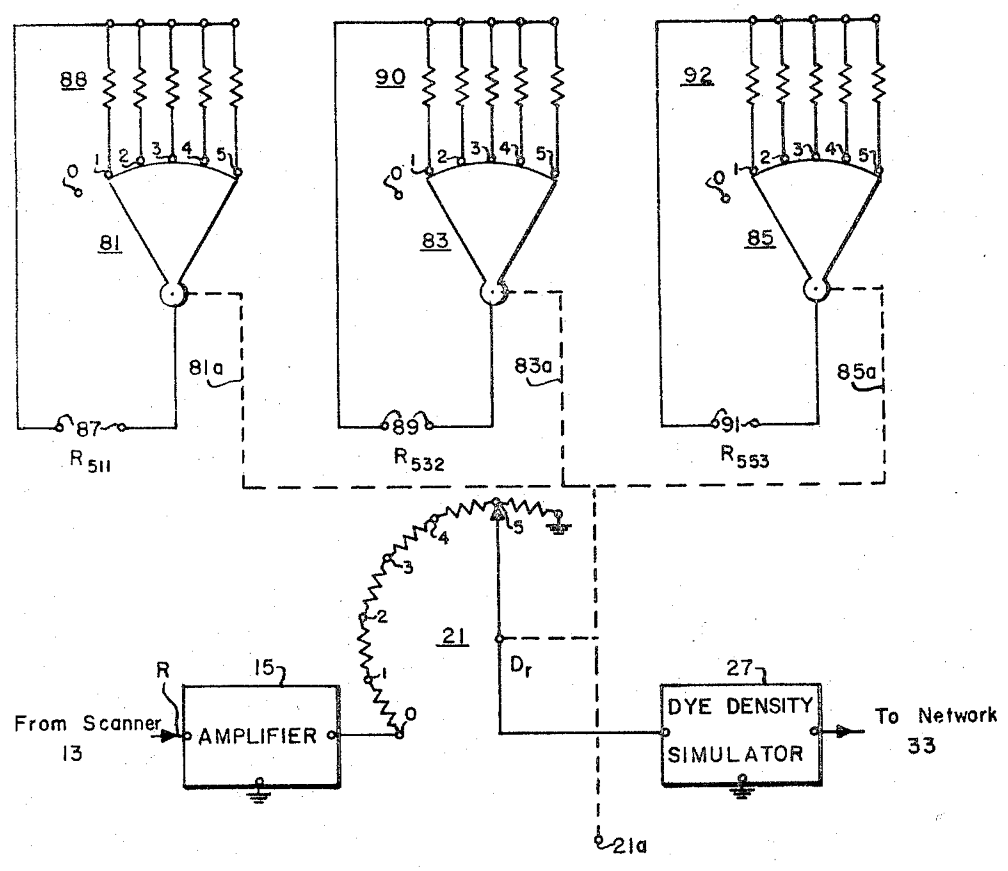
Fig. 8 is an electromechanical diagram of an arrangement for conveniently controlling the computer of Fig. 7 directly by the control knobs of the previewing equipment in Fig. 4.

In order to provide for convenient operation of the computer of Fig. 7 by the control knobs 21*a*, 23*a* and 25*a* of the electronic previewer in Fig. 4, all of those branches in Fig. 7 which are dependent on the same one of the values $D_r$, $D_g$, and $D_b$ may be controlled together by the corresponding arm of previewer potentiometers 21, 23, and 25. Such an arrangement is shown in Fig. 8 for the branches 511, 532 and 553 dependent on the red density value $D_r$. Corresponding arrangements for controlling the branches dependent on the green and blue densities $D_g$ and $D_b$, respectively, would also be employed as will be obvious from the following description of the arrangement for control of the $D_r$ dependent branches.

In Fig. 8 potentiometer 21 of the red channel of the previewer of Fig. 4 is shown constructed in the form of a series of resistive elements to provide a step potentiometer which is connected to ground at one end and to the output of amplifier 15 at its other end. As previously described, the voltage produced by amplifier 15 is proportional to the exposure of the red-sensitive positive film emulsion by light from the negative film image in the photochemical printing process. Also, the setting of step potentiometer 21 is shown as being variable in equal steps between contacts numbered 0 to 5, the resistances of the successive resistors being logarithmically tapered so that the incremental attenuation S between successive contacts changes in equal logarithmic steps. The logarithm of the voltage attenuation at any step can therefore be expressed as *n*S, where *n* is the contact number. Since optical density is equal to the logarithm of optical attenuation, each contact of potentiometer 21 will then represent a total filter density $D_r$ equal to *n*S.

The arm of potentiometer 21 is mechanically linked to the rotors of three wafer switches 81, 83, and 85, so that the angle of rotation of each rotor follows that of the arm setting as controlled by control knob 21*a*. This mechanical linkage is shown schematically by the dotted lines 81*a*, 83*a*, and 85*a*. Each wafer switch rotor may be moved into conductive relation with all of those of its contacts 0 to 5 extending to the same numbered contact as the number of the contact to which the arm of potentiometer 21 is set. That is, when the potentiometer arm is at its *n*th contact, each of the rotor arms connects together the contacts from zero to "*n*." Contacts 0 to 5 of switch 81 are each connected to one of a pair of output terminals 87 through respective ones of a set of resistors 88 respectively having a resistance of $$\frac{1}{1.13S}$$

ohms, the other of output terminals 88 being connected to the rotor of switch 81. Similarly, the contacts of switch 83 are each connected to one of a pair of output terminals 89 through respective ones of a set of resistors 90 respectively having a resistance of $$\frac{1}{0.24S}$$

ohms, the other of output terminals 89 being connected to the rotor of switch 83. Finally, the contacts of switch 85 are each connected to one of a pair of output terminals 91 through respective ones of a set of resistors 92 respectively having a resistance of $$\frac{1}{0.07S}$$

ohms, the other of output terminals 91 being connected to the rotor of switch 85.

When potentiometer 21 is at its *n*th contact, the resistance $R_{511}$ between output terminals 87 of switch 81 will be $$\frac{1}{R_{511}}=\frac{n}{1/1.13S}\text{ or }R_{511}=\frac{1}{1.13nS}=\frac{1}{1.13D_r}\qquad(16)$$

Similarly, the resistance $R_{532}$ between output terminals 89 of switch 83 will be $$R_{532}=\frac{1}{0.24nS}=\frac{1}{0.24D_r}\qquad(17)$$

and resistance $R_{553}$ between output terminals 91 of switch 85 will be $$R_{553}=\frac{1}{0.07nS}=\frac{1}{0.07D_r}\qquad(18)$$

The resistance values given by Equations 16, 17, and 18 are those required of branches 511, 532, and 553 in the computer of Fig. 7, and comprise all the branches therein dependent on the value of total specified red density $D_r$. By employing corresponding linkages between potentiometers 23 and 25 in the green and blue channels of the previewer of Fig. 4 and respective sets of three wafer switches controlled thereby, the previewer control knobs 21*a*, 23*a* and 25*a* may be operated in the same way regardless of whether an additive or subtractive printing light is used in the photochemical printing process. The only difference in procedure will be that for additive printers the knob settings themselves will give the required filter densities, while for subtractive printers the readings provided by the computing network of Fig. 7 will be the required filter densities.

While the invention has been described in terms of various specific embodiments thereof, it will be evident to those skilled in the art of colorimetry that its teachings are applicable to many variations and modifications of those embodiments as well as to the solution of other types of colorimetric data correlation problems.

What is claimed is:

1. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units being respectively proportioned in fixed degree in accordance with the respective constant coefficients applicable to the respective specified quantities and the required quantity corresponding to that computing unit, each of said computing units being adapted to be further variably proportioned; a plurality of control means respectively variable in correspondence with the values of said specified quantities; means respectively coupling each of said control means to all computing units which include fixed proportioning in accordance with the specified quantity corresponding to such control means, each of said control means respectively being adapted to control the variable proportioning of all computing units coupled thereto in predetermined relation to its own variation without altering the fixed proportioning thereof; and means respectively connected to each of said computing units and responsive to the respective total proportionings thereof to respectively indicate the values of said required quantities.

2. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units itself comprising a plurality of elements respectively proportioned in fixed degree in accordance with the respective specified quantities coefficients applicable to the respective specified quantities and the required quantity corresponding to that computing unit, each of said elements being adapted to be further variably proportioned; a plurality of control means respectively variable in correspondence with the values of said specified quantities; means respectively coupling each of said control means to all of said elements which are fixed proportioned in accordance with constant coefficients applicable to the same one of said specified quantities to which such control means corresponds, said control means respectively being adapted to commonly control the variable proportioning of all elements coupled thereto in predetermined relation to its own variation without altering the fixed proportioning thereof; and means respectively connected to each of said computing units and responsive to the sum of the net proportionings of all elements thereof to respectively indicate the values of said required quantities.

3. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing units respectively corresponding to said plurality of quantities, each of said computing units itself comprising a plurality of elements respectively proportioned in fixed degree in accordance with the reciprocals of the respective constant coefficients applicable to the respective specified quantities and the required quantity corresponding to that computing unit, each of said elements being adapted to be further variably reciprocally proportioned; a plurality of control means respectively variable in correspondence with the value of said specified quantities; means respectively coupling each of said control means to all of said elements which are fixed proportioned in accordance with the reciprocals of constant coefficients applicable to the same one of said specified quantities to which such control means corresponds, said control means respectively being adapted to commonly control the variable proportioning of all elements coupled thereto in reciprocal relation to its own variation without altering the fixed proportioning thereof; and means respectively connected to each of said computing units and responsive to the reciprocal of the sum of the net proportionings of all elements thereof to respectively indicate the values of said required quantities.

4. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units itself comprising a plurality of elements respectively proportioned in fixed degree in accordance with the respective constant coefficients applicable to the respective specified quantities and the required quantity corresponding to that computing unit, each of said elements being adapted to be further variably proportioned; a plurality of variable control means respectively corresponding to said specified quantities; means respectively coupling each of said control means to all of said elements which are fixed proportioned in accordance with constant coefficients applicable to the same one of said specified quantities to which such control means corresponds, said control means respectively being adapted to commonly control the variable proportioning of all elements coupled thereto in predetermined relation to its own variation without altering the fixed proportioning thereof; means connected to each of said control means for providing respective variation thereof in proportion to the values of the corresponding ones of said specified quantities; and means respectively connected to each of said computing units and responsive to the sum of the net proportionings of all elements thereof to respectively indicate the values of said required quantities.

5. A computer for determining the value of each of a plurality of required colorimetric quantities which are respectively equal to the sum of respective arbitrary quantities plus the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units being respectively fixed proportioned in accordance with the respective constant coefficients applicable to the respective specified quantities and the required quantity corresponding to that computing unit, each of said computing units being adapted to be further variably proportioned; a plurality of principal control means respectively variable in correspondence with the values of said specified quantities; means respectively coupling each of said principal control means to all computing units which include fixed proportioning in accordance with the specified quantity corresponding to such principal control means, each of said principal control means respectively being adapted to control the variable proportioning of all computing units coupled thereto in predetermined relation to its own variation without altering the fixed proportioning thereof; auxiliary variable control means coupled to each of said computing units to effect additional control of the variable proportioning thereof in accordance with the values of said respective arbitrary quantities; and means respectively connected to each of said computing units and responsive to the respective total proportionings thereof to respectively indicate the values of said required quantities.

6. A computer for determining the value of each of a plurality of required colorimetric quantities which are respectively equal to the sum of respective multiples of an arbitrary quantity plus the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units itself comprising a plurality of principal elements respectively proportioned in fixed degree in accordance with the respective constant coefficients applicable to the respective given quantities and the required quantity corresponding to that computing unit, each of said principal elements being adapted to be further variably proportioned; said computing units further respectively comprising individual ones of a plurality of auxiliary elements which are adapted to be equally variably proportioned; a plurality of principal control means respectively variable in correspondence with the values of said specified quantities; means respectively coupling each of said principal control means to all of said principal elements which are fixed proportioned in accordance with constant coefficients applicable to the same one of said specified quantities to which such principal control means corresponds, said principal control means respectively being adapted to commonly control the variable proportioning of all principal elements coupled thereto in predetermined relation to its own variation without altering the fixed proportioning thereof; means respectively connected to each of said computing units for indicating a numerical value determined by the sum of the net proportionings of all elements thereof; and auxiliary variable control means coupled to each of said auxiliary elements for commonly controlling the variable proportioning thereof in accordance with the value of said arbitrary quantity.

7. A computer for determining the value of each of a plurality of required colorimetric quantities which are respectively equal to the sum of respective multiples of an arbitrary quantity plus the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units itself comprising a plurality of principal elements respectively proportioned in fixed degree in accordance with the reciprocals of the respective constant coefficients applicable to the respective specified quantities and the required quantity corresponding to that computing unit, each of said principal elements being adapted to be further variably proportioned; said computing units further respectively comprising individual ones of a plurality of auxiliary elements which are adapted to be equally variably proportioned; a plurality of principal control means respectively variable in correspondence with the values of said specified quantities; means respectively coupling each of said principal control means to all of said principal elements which are fixed proportioned in accordance with the reciprocals of constant coefficients applicable to the same one of said specified quantities to which such principal control means corresponds, said principal control means respectively being adapted to commonly control the variable proportioning of all principal elements coupled thereto in inverse relation to its own variation without altering the fixed proportioning thereof; means respectively connected to each of said computing units for indicating a numerical value determined by the reciprocal of the sum of the net proportionings of all elements thereof; and auxiliary variable control means connected to each of said auxiliary elements for commonly controlling the variable proportioning thereof in accordance with the reciprocal of the value of said arbitrary quantity.

8. A computer for determining the value of each of a plurality of required colorimetric quantities which are respectively equal to the sum of respective multiples of an arbitrary quantity plus the sum of the products of the value of each of a plurality of specified colorimetric quantities multiplied by respective constant coefficients for each combination of specified and required quantities, comprising: a plurality of elementary computing units respectively corresponding to said plurality of required quantities, each of said computing units itself comprising a plurality of principal elements respectively proportioned in fixed degree in accordance with the respective constant coefficients applicable to the respective specified quantities and the required quantity corresponding to that computing unit, each of said principal elements being adapted to be further variably proportioned; said computing units further respectively comprising individual ones of a plurality of auxiliary elements which are adapted to be equally variably proportioned; a plurality of variable principal control means respectively corresponding to said specified quantities; electronic color picture previewing means connected to each of said principal control means for providing respective variation thereof in proportion to the values of the corresponding ones of said specified quantities; means respectively coupling each of said principal control means to all of said principal elements which are fixed proportioned in accordance with constant coefficients applicable to the same one of said specified quantities to which such principal control means corresponds, said principal control means respectively being adapted to commonly control the variable proportioning of all principal elements coupled thereto in predetermined relation to its own variation without altering the fixed proportioning thereof; means respectively connected to each of said computing units for indicating a numerical value determined by the sum of the net proportionings of all elements thereof; and auxiliary variable control means connected to each of said auxiliary elements for commonly controlling the variable proportioning thereof in accordance with the value of said arbitrary quantity.

9. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, comprising: a plurality of elementary computing units respectively corresponding to said plurality of filter sets, each of said computing units itself comprising a plurality of elements respectively proportioned in fixed degree in accordance with the effective color attenuation coefficients of the filters in the corresponding set for respective ones of said primary color components, each of said elements being adapted to be further variably proportioned; a plurality of control means respectively variable in correspondence with the values of said primary color components; means respectively coupling each of said control means to all of said elements which are fixed proportioned in accordance with color attenuation coefficients applicable to the same one of said primary color components to which such control means corresponds, said control means respectively being adapted to commonly control the variable proportioning of all elements coupled thereto in predetermined relation to its own variation without altering the fixed proportioning thereof; and means respectively connected to each of said computing units and responsive to the sum of the net proportionings of all elements thereof to respectively indicate the required total nominal color attenuative value of each of said sets of filters.

10. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing units respectively corresponding to said plurality of filter sets, each of said elementary computing units being respectively proportioned in fixed degree in accordance with the effective color attenuation coefficients of the filters in the corresponding set for respective ones of said primary color components, each of said computing units being adapted to be further variably proportioned; a plurality of principal control means respectively variable in correspondence with the values of said primary color components; means respectively coupling each of said principal control means to all computing units which include fixed proportioning in accordance with color attenuation coefficients applicable to the same one of said primary color components to which such control means corresponds, each of said principal control means respectively being adapted to control the variable proportioning of all computing units coupled thereto in predetermined relation to its own variation without altering the fixed proportioning thereof; auxiliary variable control means coupled to each of said computing units to effect additional control of the respective variable proportioning thereof in accordance with said common neutral attenuative component; and means respectively connected to each of said computing units and responsive to the respective total proportionings thereof to respectively indicate the required total nominal color attenuative value of each of said sets of filters.

11. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing units respectively corresponding to said plurality of filter sets, each of said computing units itself comprising a plurality of principal elements respectively proportioned in fixed degree in accordance with the effective color attenuation coefficients of the filters in the corresponding set for respective ones of said primary color components, each of said principal elements being adapted to be further variably proportioned; said computing units further respectively comprising individual ones of a plurlaity of auxiliary elements which are adapted to be equally variably proportioned; a plurality of principal control means respectively variable in correspondence with the values of said primary color components; means respectively coupling each of said principal control means to all of said principal elements which are fixed proportioned in accordance with color attenuative coefficients applicable to the same one of said primary color components to which such principal control means corresponds, said principal control means respectively being adapted to commonly control the variable proportioning of all principal elements coupled thereto in predetermined relation to its own variation without altering the fixed proportioning thereof; means respectively connected to each of said computing units and responsive to the sum of the net proportionings of all elements thereof to respectively indicate the required total nominal color attenuative value of each of said sets of filters; and auxiliary variable control means coupled to each of said auxiliary elements for commonly controlling the variable proportioning thereof in accordance with said common neutral attenuative component.

12. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values being supplementary to a common neutral attenuative component dependent on the arbitrarily selected number of filters in all of said sets, comprising: a plurality of elementary computing units respectively corresponding to said plurality of filter sets, each of said computing units itself comprising a plurality of principal elements respectively proportioned in fixed degree in accordance with the effective color attenuation coefficients of the filters in the corresponding set for respective ones of said primary color components, each of said principal elements being adapted to be further variably proportioned; said computing units further respectively comprising individual ones of a plurality of auxiliary elements which are adapted to be equally variably proportioned; a plurality of principal control means respectively variable in correspondence with the specified values of said primary color components; means respectively coupling each of said principal control means to all of said principal elements which are fixed proportioned in accordance with color attenuative coefficients applicable to the same one of said primary color components to which such principal control means corresponds, said principal control means respectively being adapted to commonly control the variable proportioning of all principal elements coupled thereto in predetermined relation to its own variation without altering the fixed proportioning thereof; means respectively connected to each of said computing units and responsive to the sum of the net proportionings of all elements thereof to respectively indicate the required total nominal color attenuative value of each of said sets of filters; auxiliary variable control means coupled to each of said auxiliary elements for commonly controlling the variable proportioning thereof; and means coupled to said auxiliary variable control means responsive to the variable proportioning of each of said auxiliary elements for indicating the value of said supplementary neutral attenuative component.

13. A computer for determining the required total nominal color attenuative value of each of a pluarlity of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing units respectively corresponding to each of said plurality of filter sets, each of said computing units itself comprising a plurality of principal elements respectively proportioned in fixed degree in accordance with the effective color attenuation coefficients of the filters in the corresponding set for respective ones of said primary color components, each of said principal elements being adapted to be further variably proportioned; said computing units further respectively comprising individual ones of a plurality of auxiliary elements which are adapted to be equally variably proportioned; a plurality of variable principal control means respectively corresponding to said primary color components; means respectively coupling each of said principal control means to all of said principal elements which are fixed proportioned in accordance with color attenuative coefficients applicable to the same one of said primary color components to which such principal control means corresponds, said principal control means respectively being adapted to commonly control the variable proportioning of all principal elements coupled thereto in predetermined relation to its own variation without altering the fixed proportioning thereof; electronic color picture previewing means connected to each of said principal control means for providing respective variation thereof in proportion to the values of the corresponding ones of said primary color components; means respectively connected to each of said computing units and responsive to the sum of the net proportionings of all elements thereof to respectively indicate the required total nominal color attenuative value of each of said sets of filters; and auxiliary variable control means coupled to each of said auxiliary elements for commonly controlling the variable proportioning thereof in accordance with the value of said common neutral attenuative component.

14. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary co'or components, the required nominal color attenuative values being supplementary to a common neutral attenuative component dependent on the arbitrarily selected number of filters in all of said sets, comprising: a plurality of elementary computing units respectively corresponding to each of said plurality of filter sets, each of said computing units itself comprising a plurality of principal elements respectively proportioned in fixed degree in accordance with the effective color attenuation coefficients of the filters in the corresponding set for respective ones of said primary color components, each of said principal elements being adapted to be further variably proportioned; said computing units further respectively comprising individual ones of a plurality of auxiliary elements which are adapted to be equally variably proportioned; a plurality of variable principal control means respectively corresponding to said primary color components; means respectively coupling each of said principal control means to all of said principal elements which are fixed proportioned in accordance with color attenuative coefficients applicable to the same one of said primary color components to which such principal control means corresponds, said principal control means respectively being adapted to commonly control the variable proportioning of all principal elements coupled thereto in predetermined relation to its own variation without altering the fixed proportioning thereof; electronic color picture previewing means connected to each of said principal control means for providing respective variation thereof in proportion to the values of the corresponding ones of said primary color components; means respectively connected to each of said computing units and responsive to the sum of the net proportionings of all elements thereof to respectively indicate the required total nominal color attenuative value of each of said sets of filters; auxiliary variable control means coupled to each of said auxiliary elements for commonly controlling the variable proportioning thereof; an additional elementary computing unit comprising an additional element coupled to said auxiliary variable control means and variably proportioned thereby with said auxiliary elements; and additional indicating means coupled to said additional computing unit, said additional computing unit being adapted to be controlled in accordance with the total number of filters in all of said sets to cause said additional indicating means to indicate the value of said supplementary neutral attenuative component.

15. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing networks respectively corresponding to said plurality of required quantities, each of said computing networks comprising a plurality of resistive branches the resistances of which are respectively proportioned in fixed degree in accordance with the respective constant coefficients applicable to the respective specified quantities and the required quantity corresponding to that computing network, the resistance of each of said branches being adapted to be further variably proportioned; a plurality of control means respectively variable in correspondence with the values of said specified quantities; means respectively coupling each of said control means to all of said branches having resistances which are fixed proportioned in accordance with constant coefficients applicable to the same one of said specified quantities to which such control means corresponds, said control means respectively being adapted to commonly control the variable resistive proportioning of all branches coupled thereto in predetermined relation to its own variation without altering the fixed proportioning thereof; and a plurality of electrical measuring means respectively connected to each of said computing networks and responsive to the sum of the net resistances of all branches thereof to respectively indicate the values of said required quantities.

16. A computer for determining the value of each of a plurality of required colorimetric quantities which are respectively proportional to the sum of the products of the value of each of a plurality of specified colorimetric quantities multiplied by respective constant coefficients for each combination of specified and required quantities, comprising: a plurality of elementary computing networks respectively corresponding to said plurality of required quantities, each of said computing networks comprising a plurality of resistive branches the resistances of which are respectively proportioned in fixed degree in accordance with the reciprocals of the respective constant coefficients applicable to the respective specified quantities and the required quantity corresponding to that computing network, the resistance of each of said branches being adapted to be further variably reciprocally proportioned; a plurality of control means respectively variable in correspondence with the values of said specified quantities; means respectively coupling each of said control means to all of said branches having resistances which are fixed proportioned in accordance with the reciprocals of constant coefficients applicable to the same one of said specified quantities to which such control means corresponds, said control means respectively being adapted to commonly control the variable resistive proportioning of all branches coupled thereto in predetermined relation to its own variation without altering the fixed proportioning thereof; electrical power supply means connected between one branch of each of said computing networks and all remaining branches thereof in common; and a plurality of electrical current responsive means respectively connected in each of said computing networks between said power supply and a common connection of all branches thereof and responsive to the reciprocal of the sum of the net resistances of all branches to respectively indicate the values of said required quantities.

17. A computer for determining the value of each of a plurality of required colorimetric quantities which are respectively equal to the sum of the products of the value of each of a plurality of specified colorimetric quantities multiplied by respective constant coefficients for each combination of specified and required quantities, comprising: a plurality of elementary computing networks respectively corresponding to said plurality of required quantities, each of said computing networks comprising a plurality of resistive branches the resistances of which are respectively proportioned in fixed degree in accordance with the respective constant coefficients applicable to the respective specified quantities and the required quantity corresponding to that computing network, the resistance of each of said branches being adapted to be further variably proportioned; a plurality of variable control means respectively corresponding to each of said given quantities; means respectively coupling each of said control means to all of said branches having resistances which are fixed proportioned in accordance with constant coefficients applicable to the same one of said specified quantities to which such control means corresponds, said control means respectively being adapted to commonly control the variable resistive proportioning of all branches coupled thereto in predetermined relation to its own variation without altering the fixed proportioning thereof; means connected to each of said control means for providing respective variation thereof in proportion to the values of the corresponding ones of said specified quantities; and a plurality of electrical measuring means respectively connected to each of said computing networks and responsive to the sum of the net resistances of all resistive branches thereof to respectively indicate the values of said required quantities.

18. A computer for determining the value of each of a plurality of required colorimetric quantities which are respectively equal to the sum of respective multiples of an arbitrary quantity plus the sum of the products of the value of each of a plurality of specified colorimetric quantities multiplied by respective constant coefficients for each combination of specified and required quantities, comprising: a plurality of elementary computing networks respectively corresponding to said plurality of required quantities, each of said computing networks comprising a plurality of principal resistive branches the resistances of which are respectively proportioned in fixed degree in accordance with the respective constant coefficients applicable to the respective specified quantities and the required quantity corresponding to that computing network, the resistance of each of said principal branches being adapted to be further variably proportioned; said computing networks further respectively comprising individual ones of a plurality of auxiliary resistive branches the resistances of which are adapted to be equally variably proportioned; a plurality of principal control means respectively variable in correspondence with the values of said specified quantities; means respectively coupling each of said principal control means to all of said principal branches having resistances which are fixed proportioned in accordance with constant coefficients applicable to the same one of said specified quantities to which such principal control means corresponds, said principal control means respectively being adapted to commonly control the variable resistive proportioning of all principal branches coupled thereto in predetermined relation to its own variation without altering the fixed proportioning thereof; a plurality of electrical measuring means respectively connected to said computing networks for respectively indicating numerical values determined by the sum of the net resistances of all branches thereof; and auxiliary variable control means coupled to each of said auxiliary branches for controlling the variable resistive proportioning thereof in accordance with the value of said arbitrary quantity.

19. A computer for determining the value of each of a plurality of required colorimetric quantities which are respectively equal to the sum of respective multiples of an arbitrary quantity plus the sum of the products of the value of each of a plurality of specified colorimetric quantities multiplied by respective constant coefficients for each combination of specified and required quantities, comprising: a plurality of elementary computing networks respectively corresponding to said plurality of required quantities, each of said computing networks comprising a plurality of principal resistive branches the resistances of which are respectively proportioned in fixed degree in accordance with the respective constant coefficients applicable to the respective specified quantities and the required quantity corresponding to that computing network, the resistance of each of said principal branches being adapted to be further variably proportioned; said computing networks further respectively comprising individual ones of a plurality of auxiliary resistive branches the resistances of which are adapted to be equally variably proportioned; a plurality of variable principal control means respectively corresponding to said specified quantities; electronic color picture previewing means connected to each of said principal control means for providing respective variation thereof in proportion to the values of the corresponding ones of said specified quantities; means respectively coupling each of said principal control means to all of said principal branches having resistances which are fixed proportioned in accordance with constant coefficients applicable to the same one of said specified quantities to which such principal control means corresponds, said principal control means respectively being adapted to commonly control the variable resistive proportioning of all principal branches coupled thereto in predetermined relation to its own variation without altering the fixed proportioning thereof; a plurality of electrical measuring means respectively connected to said computing networks for respectively indicating numerical values determined by the sum of the net resistances of all branches thereof; and auxiliary variable control means coupled to each of said auxiliary branches for controlling the variable resistive proportioning thereof in accordance with the value of said arbitrary quantity.

20. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, comprising: a plurality of elementary computing networks respectively corresponding to said plurality of filter sets, each of said computing networks comprising a plurality of resistive branches the resistances of which are respectively proportioned in fixed degree in accordance with the effective color attenuative coefficients of the filters in the corresponding set for respective ones of said primary color components, the resistance of each of said branches being adapted to be further variably proportioned; a plurality of control means respectively variable in correspondence with the values of said primary color components; means respectively coupling each of said control means to all of said branches having resistances which are fixed proportioned in accordance with color attenuative coefficients applicable to the same one of said primary color components to which such control means corresponds, said control means respectively being adapted to commonly control the variable resistive proportioning of all branches coupled thereto in predetermined relation to its own variation without altering the fixed resistive proportioning thereof; and a plurality of electrical measuring means respectively connected to each of said computing networks and responsive to the sum of the net resistances of all branches thereof to respectively indicate the required total nominal color attenuative value of each of said sets of filters.

21. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing networks respectively corresponding to said plurality of filter sets, each of said computing networks comprising a plurality of principal resistive branches the resistances of which are respectively proportioned in fixed degree in accordance with the effective color attenuative coefficients of the filters in the corresponding set for respective ones of said primary color components, the resistance of each of said principal branches being adapted to be further variably proportioned; said computing networks further respectively comprising individual ones of a plurality of auxiliary resistive branches the resistances of which are adapted to be equally variably proportioned; a plurality of principal control means respectively variable in correspondence with the values of said primary color components; means respectively coupling each of said principal control means to all of said principal branches having resistances which are fixed proportioned in accordance with color attenuative coefficients applicable to the same one of said primary color components to which such principal control means corresponds, said principal control means respectively being adapted to commonly control the variable resistive proportioning of all branches coupled thereto in predetermined relation to its own variation without altering the fixed resistive proportioning thereof; a plurality of electrical measuring means respectively connected to each of said computing networks and responsive to the sum of the net resistances of all branches thereof to respectively indicate the required total nominal color attenuative value of each of said sets of filters; and auxiliary variable control means coupled to each of said auxiliary branches for commonly controlling the variable proportioning thereof in accordance with the value of said common neutral attenuative component so as to cause the indication of one of said electrical measuring means to represent a desired total nominal color attenuative value of the corresponding filter set.

22. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing networks respectively corresponding to said plurality of filter sets, each of said computing networks comprising a plurality of principal resistive branches the resistances of which are respectively proportioned in fixed degree in accordance with the effective color attenuative coefficients of the filters in the corresponding set for respective ones of said primary color components, the resistance of each of said principal branches being adapted to be further variably proportioned; said computing networks further respectively comprising individual ones of a plurality of auxiliary resistive branches the resistances of which are adapted to be equally variably proportioned; a plurality of variable principal control means respectively corresponding to said primary color components; means respectively coupling each of said principal control means to all of said principal branches having resistances which are fixed proportioned in accordance with color attenuative coefficients applicable to the same one of said primary color components to which such principal control means corresponds, said principal control means respectively being adapted to commonly control the variable resistive proportioning of all principal branches coupled thereto in predetermined relation to its own variation without altering the fixed resistive proportioning thereof; electronic color picture previewing means connected to each of said principal control means for providing respective variation thereof in proportion to the values of the corresponding ones of said primary color components; a plurality of electrical measuring means respectively connected to each of said computing networks and responsive to the sum of the net resistances of all branches thereof to respectively indicate the required total nominal color attenuative value of each of said sets of filters; and auxiliary variable control means coupled to each of said auxiliary branches for commonly controlling the variable proportioning thereof in accordance with the value of said common neutral attenuative component so as to cause the indication of one of said electrical measuring means to represent a desired total nominal color attenuative value of the corresponding filter set.

23. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values being supplementary to a common neutral attenuative value dependent on the arbitrarily selected number of filters in all of said sets, comprising: a plurality of elementary computing networks respectively corresponding to said plurality of filter sets, each of said computing networks comprising a plurality of principal resistive branches the resistances of which are respectively proportioned in fixed degree in accordance with the effective color attenuative coefficients of the filters in the corresponding set for respective ones of said primary color components, the resistance of each of said principal branches being adapted to be further variably proportioned; said computing networks further respectively comprising individual ones of a plurality of auxiliary resistive branches the resistances of which are adapted to be equally variably proportioned; a plurality of variable principal control means respectively corresponding to said primary color components; means respectively coupling each of said principal control means to all of said principal branches having resistances which are fixed proportioned in accordance with color attenuative coefficients applicable to the same one of said primary color components to which such principal control means corresponds, said principal control means respectively being adapted to commonly control the variable resistive proportioning of all branches coupled thereto in predetermined relation to its own variation without altering the fixed resistive proportioning thereof; electronic color picture previewing means connected to each of said principal control means for providing respective variation thereof in proportion to the values of the corresponding ones of said primary color components; a plurality of electrical measuring means respectively connected to each of said computing networks and responsive to the sum of the net resistances of all branches thereof to respectively indicate the required total nominal color attenuative value of each of said sets of filters; auxiliary variable control means coupled to each of said auxiliary branches for commonly controlling the variable proportioning thereof so as to cause the indication of one of said electrical measuring means to represent a desired total nominal color attenuative value of the corresponding filter set; an additional elementary computing network comprising an additional resistive branch coupled to said auxiliary variable control means and variably proportioned thereby with said auxiliary branches; and additional electrical measuring means coupled to said additional computing network, said additional computing network being adapted to be controlled in accordance with the total number of filters in all of said sets so as to cause said additional measuring means to indicate said common neutral attenuative value.

24. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values including respective multiples of a common neutral attenuative component of arbitrary value, comprising: a plurality of elementary computing networks respectively corresponding to said plurality of filter sets, each of said computing networks respectively comprising a plurality of principal resistive branches connected to a common node, the resistances of said principal branches being respectively proportioned in fixed degree in accordance with the effective color attenuative coefficients of the filters in the corresponding set for respective ones of said primary color components, the resistance of each of said principal branches being adapted to be further variably proportioned; each of said computing networks further respectively comprising individual ones of a plurality of auxiliary resistive branches connected to the common node thereof, the resistances of all said auxiliary branches being adapted to be equally variably proportioned; a plurality of principal control means respectively variable in correspondence with the specified values of said primary color components; means respectively coupling each of said principal control means to all of said principal branches which are fixed proportioned in accordance with color attenuative coefficients applicable to the same one of said primary color components to which such principal control means corresponds, said principal control means respectively being adapted to commonly control the variable resistive proportioning of all principal branches coupled thereto in predetermined relation to its own variation without altering the fixed resistive proportioning thereof; a plurality of electrical current responsive means respectively connected to said common nodes of said computing networks and responsive to the sum of the net resistances of all branches thereof to respectively indicate the required total nominal color attenuative value of each of said sets of filters; and auxiliary variable control means coupled to each of said auxiliary branches for commonly controlling the variable resistive proportioning thereof so as to cause the indication of one of said electrical current responsive means to represent a desired total nominal color attenuative value of the corresponding filter set.

25. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, comprising: a plurality of elementary computing networks respectively corresponding to said plurality of filter sets, each of said computing networks comprising a plurality of principal resistive branches respectively corresponding to said primary color components and which are connected to a common node; each of said principal resistive branches comprising a plurality of parallel-connected resistors of which all resistors in each branch are equally proportional to the reciprocal of the effective color attenuative coefficient of the filters in the corresponding filter set for the corresponding primary color component, the number of resistors in each principal branch being variable; a plurality of auxiliary variable resistive branches respectively comprised in said computing units and connected to the common nodes thereof, the resistances of all said auxiliary branches being adapted to be equally variably proportioned; a plurality of principal control means respectively variable in correspondence with discrete increments in the values of respective ones of said primary color components; means respectively coupling each of said principal control means to all of said principal branches which correspond to the same one of said primary color components as such control means, said principal control means respectively being adapted to commonly control the number of resistors in each principal branch coupled thereto in discrete increments related to its own incremental variation; power supply means connected to all resistive branches of each of said computing networks for establishing respective electrical signals at the respective nodes thereof; a plurality of electrical signal responsive means respectively connected to said common nodes of said computing networks and responsive to the signals established thereat to respectively indicate the required total nominal color attenuative value of each of said sets of filters; and auxiliary variable control means coupled to each of said auxiliary branches for commonly controlling the reciprocal of the variable resistive proportioning thereof so as to cause the indication of one of said electrical signal responsive means to correspond to a desired total nominal color attenuative value of the corresponding filter set.

26. A computer for determining the required total nominal color attenuative value of each of a plurality of sets of color compensating filters of which each set is respectively adapted to principally attenuate respective ones of a plurality of primary color components of substantially white light serially passed through all of said sets so as to produce light having specified relative values of said primary color components, the required nominal color attenuative values being supplementary to a common neutral attenuative value dependent on the arbitrarily selected number of filters in all of said sets, comprising: a plurality of elementary computing networks respectively corresponding to said plurality of filter sets, each of said computing networks comprising a plurality of principal resistive branches respectively corresponding to said primary color components and which are connected to a common node; each of said principal resistive branches comprising a plurality of parallel-connected resistors of which all resistors in each branch are equally proportional to the reciprocal of the effective color attenuative coefficient of the filters in the corresponding filter set for the corresponding primary color component, the number of resistors in each principal branch being variable; a plurality of auxiliary variable resistive branches respectively comprised in said computing units and connected to the common nodes thereof, the resistances of all said auxiliary branches being adapted to be equally variably proportioned; a plurality of principal control means respectively variable in correspondence with discrete increments in the values of respective one of said primary color components; means respectively coupling each of said principal control means to all of said principal branches which correspond to the same one of said primary color components as such control means, said principal control means respectively being adapted to commonly control the number of resistors in each principal branch coupled thereto in discrete increments related to its own incremental variation; power supply means connected to all resistive branches of each of said computing networks for establishing respective electrical signals at the respective nodes thereof; a plurality of electrical signal responsive means respectively connected to said common nodes of said computing networks and responsive to the signals established thereat to respectively indicate the required total nominal color attenuative value of each of said sets of filters; auxiliary variable control means coupled to each of said auxiliary branches for commonly controlling the reciprocal value of the variable resistive proportioning thereof so as to cause the indication of one of said electrical signal responsive means to correspond to a desired total nominal color attenuative value of the corresponding filter set; an additional elementary computing network comprising a first variable resistor connected to said auxiliary control means, the reciprocal of the resistance of said first resistor being controlled thereby equally with the reciprocal proportioning of each of said auxiliary resistive branches; a second variable resistor comprised in said additional computing network connected to said first resistor, the resistance of said second resistor being adjustable in accordance with the reciprocal of the number of filters in all of said filter sets; and electrical measuring means connected to the junction of said first and second resistors and responsive to the sum of the resistances thereof to indicate said common neutral attenuative value.

References Cited in the file of this patent

UNITED STATES PATENTS

| | | |
|---|---|---|
| 2,540,797 | Stearns | Feb. 6, 1951 |
| 2,540,798 | Stearns | Feb. 6, 1951 |
| 2,542,564 | Park | Feb. 20, 1951 |
| 2,630,968 | Muskat | Mar. 10, 1953 |
| 2,757,571 | Loughren | Aug. 7, 1956 |
| 2,863,938 | Evans et al. | Dec. 9, 1958 |
| 2,884,194 | Evans | Apr. 28, 1959 |

FOREIGN PATENTS

| | | |
|---|---|---|
| 761,416 | Great Britain | Nov. 14, 1956 |

OTHER REFERENCES

Analog Methods in Computation and Simulation (Soroka), pages 108–110, 1954.